US012724612B2

(12) United States Patent
Soltaniyeh et al.

(10) Patent No.: US 12,724,612 B2
(45) Date of Patent: Sep. 1, 2026

(54) SYSTEMS AND METHODS FOR PARALLEL DATA PROCESSING

(71) Applicant: Samsung Electronics Co., Ltd., Suwon-si (KR)

(72) Inventors: Mohammadreza Soltaniyeh, Sunnyvale, CA (US); Xuebin Yao, Mountain View, CA (US); Ramdas Kachare, Pleasanton, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 286 days.

(21) Appl. No.: 18/506,993

(22) Filed: Nov. 10, 2023

(65) Prior Publication Data

US 2024/0419450 A1 Dec. 19, 2024

Related U.S. Application Data

(60) Provisional application No. 63/521,251, filed on Jun. 15, 2023.

(51) Int. Cl.

*G06F 9/38* (2018.01)
*G06F 9/30* (2018.01)
*G06F 13/42* (2006.01)

(52) U.S. Cl.

CPC ........ *G06F 9/3842* (2013.01); *G06F 9/30043* (2013.01); *G06F 13/4247* (2013.01)

(58) Field of Classification Search

None

See application file for complete search history.

(56) References Cited

U.S. PATENT DOCUMENTS

| | | | |
|---|---|---|---|
| 8,516,222 | B1 | 8/2013 | Agarwal et al. |
| 8,726,251 | B2 | 5/2014 | Kalogeropulos et al. |
| 9,092,346 | B2 | 7/2015 | McCormick, Jr. |
| 9,268,596 | B2 | 2/2016 | Rajwar et al. |
| 9,940,136 | B2 | 4/2018 | Burger et al. |
| 10,031,756 | B2 | 7/2018 | Burger et al. |
| 10,061,583 | B2 | 8/2018 | Ould-Ahmed-Vall et al. |
| 10,324,768 | B2 | 6/2019 | Wang et al. |
| 11,531,552 | B2 | 12/2022 | Gupta et al. |
| 2008/0235490 | A1 | 9/2008 | Jones et al. |

(Continued)

FOREIGN PATENT DOCUMENTS

WO WO 2015/057539 A1 4/2015

OTHER PUBLICATIONS

Mytkowicz, T., et al., "Data-Parallel Finite-State Machines", ASPLOS '14, Mar. 1-5, 2014, Salt Lake City, Utah, USA, 2014, 13 pages, ACM.

(Continued)

*Primary Examiner* — Scott C Sun

(74) *Attorney, Agent, or Firm* — Womble Bond Dickinson (US) LLP

(57) ABSTRACT

Systems and methods for parallel data processing. In some embodiments, the system includes: a first processing chain; and a second processing chain, the first processing chain including: a first core; a second core; and a first inter-core bus connecting the second core of the first processing chain to the first core of the first processing chain the system being configured to forward an output of a calculation of the first processing chain to the second processing chain.

9 Claims, 8 Drawing Sheets

(56) References Cited

U.S. PATENT DOCUMENTS

| | | | | |
|---|---|---|---|---|
| 2009/0113169 | A1* | 4/2009 | Yang | G06F 7/57 712/15 |
| 2012/0079245 | A1 | 3/2012 | Wang et al. | |
| 2016/0259826 | A1* | 9/2016 | Acar | G06F 16/9535 |
| 2016/0378488 | A1 | 12/2016 | Burger et al. | |
| 2021/0048991 | A1 | 2/2021 | Tanner | |
| 2022/0214885 | A1 | 7/2022 | Foley | |
| 2022/0342673 | A1 | 10/2022 | Wang et al. | |

OTHER PUBLICATIONS

U.S. Appl. No. 17/960,033, filed Oct. 4, 2022.

* cited by examiner

Non-speculative execution

Speculative execution

SYSTEMS AND METHODS FOR PARALLEL DATA PROCESSING

CROSS-REFERENCE TO RELATED APPLICATION(S)

The present application claims priority to and the benefit of U.S. Provisional Application No. 63/521,251, filed Jun. 15, 2023, entitled "METHODS AND SYSTEMS FOR PARALLEL DATA PROCESSING FOR APPLICATIONS WITH DATA DEPENDENCY", the entire content of which is incorporated herein by reference.

FIELD

One or more aspects of embodiments according to the present disclosure relate to computing, and more particularly to systems and methods for parallel data processing.

BACKGROUND

Parallel processing is a method that may significantly speed up the performance of computationally intensive operations. Some such operations involve steps that rely, for input, on the output of other processing steps.

It is with respect to this general technical environment that aspects of the present disclosure are related.

SUMMARY

According to an embodiment of the present disclosure, there is provided a system, including: a first processing chain; and a second processing chain, the first processing chain including: a first core; a second core; and a first inter-core bus connecting the second core of the first processing chain to the first core of the first processing chain the system being configured to forward an output of a calculation of the first processing chain to the second processing chain.

In some embodiments, the first core of the first processing chain includes: a memory; and a packet processing circuit, the packet processing circuit being configured: to receive a packet including instructions; and to store the instructions in the memory.

In some embodiments, the first processing chain is configured: to perform, in the first core of the first processing chain, a first calculation based on a first speculative value; to perform, in the second core of the first processing chain, a second calculation based on a second speculative value; and to validate the first speculative value, wherein the forwarding of the output of the first calculation to the second processing chain is based on the validating.

In some embodiments, the system is configured to perform a number of speculative operations using a number of cores based on the number of speculative operations.

In some embodiments, the system further includes a first inter-chain bus, wherein an initial core of the first processing chain is connected, through the first inter-chain bus, to an initial core of the second processing chain.

In some embodiments, the system further includes: a third processing chain; and a second inter-chain bus, wherein an initial core of the first processing chain is connected, through the second inter-chain bus, to an initial core of the third processing chain.

In some embodiments, the system further includes a packet scheduler connected to the first processing chain and to the second processing chain, the packet scheduler being configured to send, to each of the first processing chain and the second processing chain, packets including instructions, parameters, and input data.

In some embodiments, the system further includes a packet scheduler connected to the first processing chain, the packet scheduler being configured: to send a first sequence of symbols to the first core of the first processing chain, for testing for a second sequence of symbols; and to send a third sequence of symbols to a first core of the second processing chain, for testing for the second sequence of symbols, wherein the first sequence of symbols overlaps with the third sequence of symbols.

In some embodiments, the first sequence of symbols overlaps with the third sequence of symbols in an overlapped area having a size greater than the second sequence of symbols.

According to an embodiment of the present disclosure, there is provided a method, including: performing, in a first core of a first processing chain of a processing circuit, a first calculation based on a first speculative value; performing, in a second core of the first processing chain, a second calculation based on a second speculative value; validating the first speculative value; and forwarding an output of the first calculation to a second processing chain of the processing circuit.

In some embodiments, the first core of the first processing chain includes: a memory; and a packet processing circuit, the packet processing circuit being configured: to receive a packet including instructions; and to store the instructions in the memory.

In some embodiments, the method further includes performing a number of speculative operations using a number of cores based on the number of speculative operations.

In some embodiments, the processing circuit further includes a first inter-chain bus, wherein an initial core of the first processing chain is connected, through the first inter-chain bus, to an initial core of the second processing chain.

In some embodiments, the processing circuit further includes: a third processing chain; and a second inter-chain bus, wherein an initial core of the first processing chain is connected, through the second inter-chain bus, to an initial core of the third processing chain.

In some embodiments, the processing circuit further includes a packet scheduler connected to the first processing chain and to the second processing chain, the packet scheduler being configured to send, to each of the first processing chain and the second processing chain, packets including instructions, parameters, and input data.

In some embodiments, the method further includes: processing a first sequence of symbols by the first core of the first processing chain, for testing for a second sequence of symbols; and processing a third sequence of symbols by a first core of the second processing chain, for testing for the second sequence of symbols, wherein the first sequence of symbols overlaps with the third sequence of symbols.

In some embodiments, the method further includes validating the second speculative value based on the output of the first calculation.

According to an embodiment of the present disclosure, there is provided a system, including: a first processing chain, including a first core and a second core; a second processing chain; and a packet scheduler, the first core being connected by an edge bus to the packet scheduler, the packet scheduler being configured: to connect to a host; to send packets to the first core of the first processing chain; and to receive packets from the first core of the first processing chain.

In some embodiments, the first core of the first processing chain is connected to the second core of the first processing chain by a first inter-core bus.

In some embodiments, the system further includes a first inter-chain bus, wherein an initial core of the first processing chain is connected, through the first inter-chain bus, to an initial core of the second processing chain.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1:
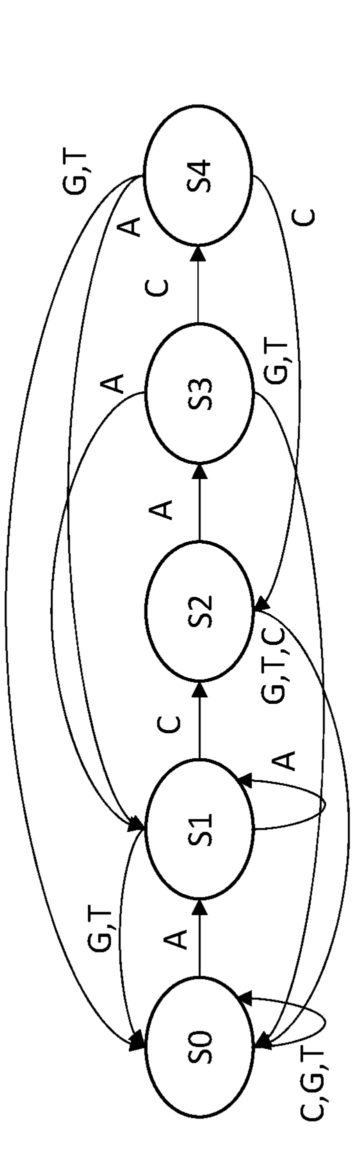
FIG. 1 is a state diagram, according to an embodiment of the present disclosure.

The detailed description set forth below in connection with the appended drawings is intended as a description of exemplary embodiments of systems and methods for parallel data processing provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Data dependency may limit the performance of some important applications, such as deoxyribonucleic acid (DNA) sequencing, text processing, and text tokenization, by limiting hardware utilization. Two important classes of applications with such strict data dependency are (1) applications that are solved using dynamic programming methods and (2) applications that are modeled as finite state machines (FSMs).

The dynamic programming approach solves the problem recursively by solving a series of subproblems. The subproblems can be grouped into stages based on their data dependence. All the subproblems within a stage have no data dependency between them and thus can be computed in parallel. This process may be referred to as wavefront parallelization. However, wavefront parallelization may be insufficient to fully exploit all the available hardware resources and, thus, may not achieve the highest performance.

Some methods address this problem by breaking the data dependency across stages through speculation techniques. This approach distributes the data among multiple compute units to maximize utilization of the computation resources. However, with the data dependency, all the compute units except the first unit may use the result of the computing units prior to that unit beginning their computation. In speculative execution, this is addressed by allowing the compute units to start their execution from a speculative state. The result of the speculative computation may be verified once the previous units' results are ready, and potentially fixed in a fixup stage.

Performance improvement in this speculative execution may only be achieved if the speculative inputs produce the correct results with a high success rate, minimizing the work that needs to be done in the fixup step. Speculation methods for dynamic programming applications may effectively improve the performance of many real-world applications. This speculation technique works in practice in part because of its convergence property. With the convergence property, the output produced by the speculative inputs converges to the same result as the actual inputs. This allows speculation methods to break the data dependency between the compute units and thus improve the performance of a dynamic programming application despite data dependency.

In addition to dynamic programming models, a finite state machine is another important abstraction for solving several problems. Similar to the dynamic programming method, finite state machines involve data-dependent iterations. This strict data dependency may make a finite state machine difficult to parallelize. One successful method to parallelize a finite state machine uses enumeration. This method resolves the dependency between two dependent computation units by forking a version of the computation starting from every possible state of the finite state machine. This is referred to as an enumerative computation. The enumerative computation performs n times more work than the sequential version, where n is less than or equal to the number of states of the finite state machine (and n is equal to the number of states in the subset (of the set of states of the finite state machine) for which speculative computations are performed). The enumerative solution may not scale well for large finite state machines, but in some real-world scenarios, multiple states in a finite state machine may converge to the same state after processing a portion of the input data (which may be referred to herein as a "chunk" of the input data). Using the convergence property of finite state machines, the enumerative computation may be optimized to scale to larger finite state machines.

The overhead of doing speculative computations may be significant. For example, if the speculation rate is high, the energy consumption and data traffic overheads of speculative execution may be high. This disclosure presents methods and designs that improve the performance and energy efficiency of speculative execution for dynamic programming and finite state machine applications by, for example, using a customized hardware design that performs the speculative computation of dynamic programming and finite state machines efficiently and flexibly.

In some embodiments, a parallel processing circuit for performing speculative computations includes a plurality of chains (or "processing chains"), each including a plurality of processors, or "cores". Each chain may perform speculative processing of a different portion, or "chunk" of the input data to be processed. Within each chain, each of a plurality of cores may process the input data with a different respective assumption about the initial condition for the calculation. The initial condition may later become known, and the output of the core that assumed the correct initial condition (if any core made the correct assumption) may be used; the outputs of the remaining cores may be discarded. The cores within a chain may be connected by inter-core buses, each of which establishes a point-to-point connection between two adjacent cores in the chain.

In some embodiments, in which speculative execution is used to test a first sequence of symbols (e.g., a sequence of letters) for a second sequence of symbols (e.g., to test whether the second sequence of symbols (e.g. a particular word) is present within the first sequence of symbols), the likelihood of convergence (e.g., the likelihood of at least one of the cores performing speculative execution having used the correct assumption about the initial condition) may be increased by separating the input sequence of symbols into portions (which may be referred to as "data chunks") so that there is some overlap between the portions (e.g., so that a first sequence of symbols (which is a first sub-sequence of the input sequence of symbols) and a second sequence of symbols (which is a second sub-sequence of the input sequence of symbols) overlap in an overlapped area. The overlapped area may have a size at least as large as the length of the third sequence of symbols.

Figure 2A:
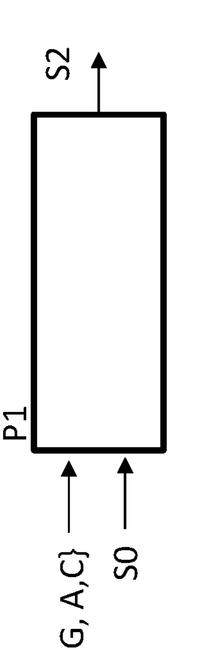
FIG. 2A an illustration of a processor performing non-speculative execution, according to an embodiment of the present disclosure.

FIG. 1 illustrates a state diagram for a finite state machine that finds an "ACAC" pattern in an input string consisting of only four letters 'A', 'C', 'G', and 'T'. The state diagram of the finite state machine shows all possible state transitions for all the letters in this four-letter alphabet. The following example shows how four processors may be used to analyze the string of characters {G, A, C, A, C}. If the initial state is known, e.g., S0, then a single processor, P1, may calculate the final state after a first data chunk including a first set of symbols (e.g., a set of characters), which may be {G, A, C}, is processed. As illustrated in FIG. 2A, if the initial state is S0 and the characters {G, A, C} are received, the final state is S2 (and the sequence of state transitions does not include a transition to state S4 (which would indicate that an instance of the substring "ACAC" had been found)).

Figure 2B:
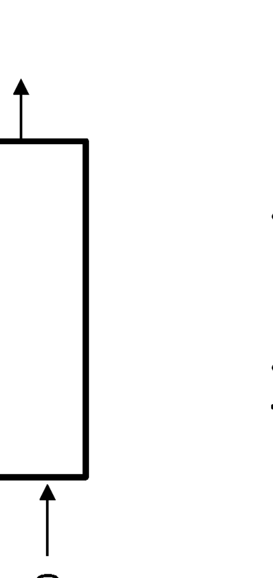
FIG. 2B an illustration of processors performing speculative execution, according to an embodiment of the present disclosure.

The enumeration method may be used for the parallel execution of the finite state machine of FIG. 1, for a second data chunk (the remainder of the string of characters, i.e., {A, C}), in a situation in which, while the calculation is being done, the initial state is not known (e.g., because the processing of the first data chunk, which will determine the initial state for the second data chunk, is being performed in parallel, by the processor P1). In this example, there are three processors. As illustrated, processor 2 (P2) starts from the speculative state S1, processor 3 (P3) starts from the speculative state S2, and processor 4 (P4) starts from the speculative state S3. Depending on the available resources, the speculative initial states tested may include all or a subset of the states in the finite state machine. For example, in FIG. 2B, only 3 out of 5 states are enumerated (S1, S2, and S3). Once all processors finish their respective computations, the results' states are compared to validate the output. In the example of FIGS. 2A and 2B, the final state of the non-speculative execution (P1) matches the starting state of the speculative execution performed by P2, thereby validating the speculative input value of P2 (where the speculative input value of P2 is the state S2). In this case, the results of the speculative execution performed by P2 are deemed correct. Otherwise (if the calculated initial state for the second data chunk does not match any of the speculative values used for initial states by the processors performing speculative execution), the execution of the state machine may be re-performed using the correct initial state for the second data chunk. In such a scenario, the execution is equivalent to a sequential process.

FIG. 2B also illustrates the convergence phenomenon in finite state machines. As FIG. 2B shows, both P1 and P3 processors finish in the same final state (S2) despite starting from a different initial state. Convergence makes the enumerative approach a more practical method for parallelizing finite state machines by reducing the number of enumerative states that are necessary to achieve high speculation accuracy.

Figure 3:
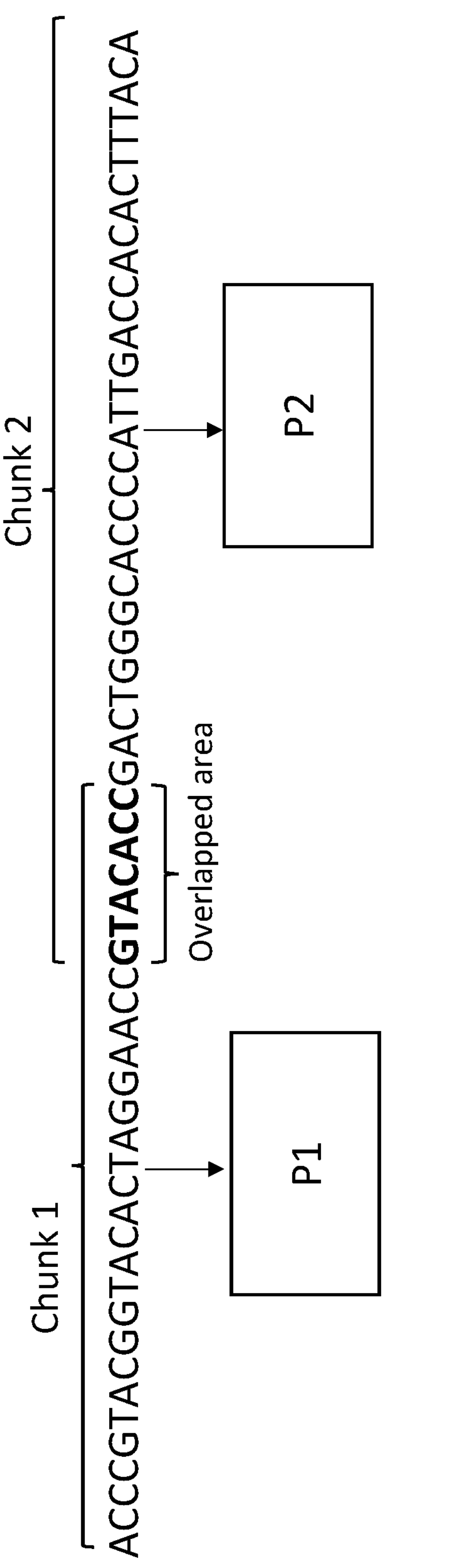
FIG. 3 is an illustration of a sequence of input symbols being separated into overlapping portions, according to an embodiment of the present disclosure.

In some embodiments, the convergence rate in the speculative finite state machine execution may be improved by leaving an overlapped area between the data chunks. The method used for the forming of data chunks from the sequence of symbols to be analyzed (a method which may be referred to as "data chunking") may impact the convergence rate in speculative finite state machine execution. The present disclosure presents an effective method to enhance the convergence rate of finite state machine execution in some cases. The simple finite state machine of FIG. 1 may be used to illustrate the method. Based on the parallelization technique illustrated in FIGS. 2A and 2B, this finite state machine can be parallelized by breaking the input into multiple data chunks and assigning each data chunk to a different processor. Since the starting states for all the processors except the first one are not known a priori, the processors may start their execution using a speculative state. FIG. 3 shows only two processors, P1 and P2, for simplicity. This disclosure suggests an improved method to perform the data chunking for the parallel execution of finite state machines. In this method, each chunk includes an overlapped area between the chunks that is part of both the data chunk (Chunk 1) processed by processor P1 and of the data chunk (Chunk 2) processed by processor P2.

In such an embodiment, P2 may start its execution starting from the overlapped area. P2 may distinguish between the execution of the overlapped area and the non-overlapped portion of its data chunk (Chunk 2). The overlapped area is only used to determine the starting state and all of the outputs (e.g., counts of transitions to the state S4) produced while processing the overlapped data (except the final state) may be discarded to avoid duplicated results (e.g., double-counting of instances of the sequence (ACAC) being searched for) that otherwise might result from processing of the overlapped area by both P1 and P2.

In some embodiments, the size of the overlapped area is at least the size of the pattern the finite state machine is configured to detect (e.g., "ACAC"). The size of the overlapped area may be only a fraction of the input sequence and may be less than the size of the input sequence itself. Using a large overlapped area may negatively impact performance, e.g., because it may result in double execution of significant portions of the input sequence.

The operation of such an embodiment may be understood as follows. If the overlapped area contains the target pattern (e.g., "ACAC" in FIG. 3), the speculative execution performed by P2 may converge regardless of its speculative initial starting state. In the example, if the pattern "ACAC" is present in the overlapped area, then for all starting states (S0 through S4), P2 always converges to the S2 state at the end of the overlapped area, which is the final state P1 reaches after processing chunk 1.

In cases in which the overlapped area does not contain the pattern, convergence cannot be guaranteed. In such a case, the likelihood of convergence is similar to that for a method that does not use overlapping data chunks. However, the method of using overlapping data chunks adds a few more cycles than a method that does not use overlapping data chunks, depending on the size of the overlapped data.

Figure 4A:
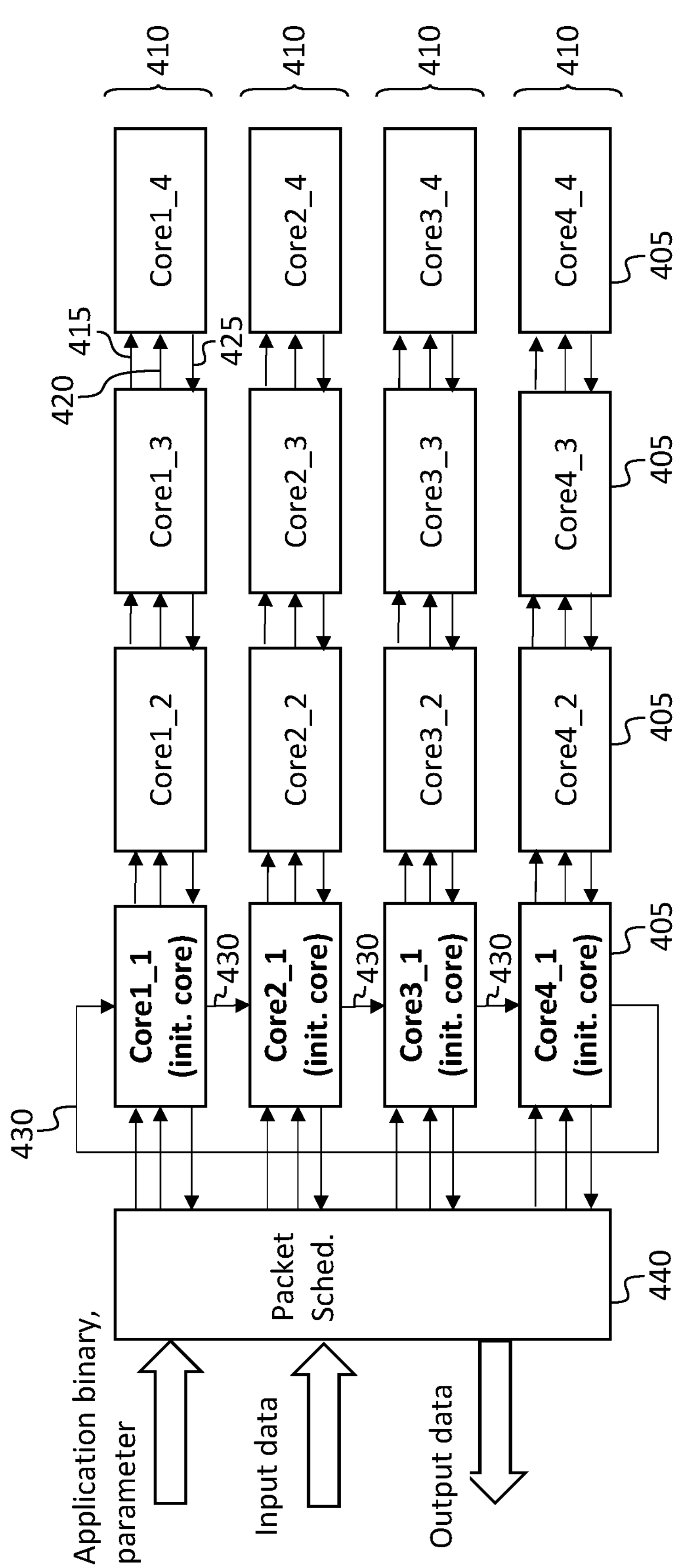
FIG. 4A is a block diagram of a parallel processing circuit, according to an embodiment of the present disclosure.

FIG. 4A shows a hardware design for a parallel processing circuit for performing the parallel speculative execution of dynamic programming and finite state machine applications. The design consists of a fixed number of processors (or "cores") 405 laid out vertically and horizontally. The cores 405 are arranged in horizontal chains (or "processing chains") 410. In FIG. 4A, the $M^{th}$ core of the $N^{th}$ chain is labeled CoreN_M. Each chain 410 may be utilized for speculative execution. The cores 405 of such a chain 410 process the same input but from a different starting state. In contrast, the different chains 410 utilize data parallelism by processing different chunks of the input data. The cores 405 within a chain 410 are connected by one or more inter-core buses. For example, each of the leftmost three cores 405 of the topmost chain 410 may be connected to a core on its right by three inter-core buses, including (i) an instruction and parameters bus 415 (used to send instructions and parameters to the right), (ii) an input data bus 420 (used to send input data to the right) and (iii) an output data bus 425 (used to send output data to the left). As used herein, a "bus" is a set of one or more conductors for carrying data; as such, a bus may consist of one or more buses, and the combination of (i) the instruction and parameters bus, (ii) the input data bus and (iii) the output data bus connecting a core 405 to a core 405 on its left (or to a core 405 on its right) may also be referred to as an inter-core bus. In some embodiments a single bus, not segmented by groups of conductors into (i) an instruction and parameters bus, (ii) an input data bus and (iii) an output data bus may be used to perform the functions that may be performed by these three buses. In such an embodiment, time-division multiplexing (TDM) may be employed to allow the single bus to perform the functions that, in some embodiments are performed by three buses. In addition to the horizontal connections, the left-most cores (or "initial" cores) of each chain are connected with a ring network, including a plurality of point-to-point connections each of which may be referred to as an inter-chain bus 430. These connections pass each chain's final state to the next chain after each chain finishes its speculative execution. Each of the inter-core buses and each of the inter-chain buses 430 may be implemented in any of several ways. For example, in a system with a single clock domain, parallel sets of conductors may be used to connect one or more registers in a core on one end of such a bus to one or more registers in a core on the other end of the bus. In other embodiments, each bus may be a serial bus with a serializer/deserializer (SERDES) circuit at each end of the bus. Such an embodiment may significantly loosen the requirement for phase match between the clock signals in the cores 405.

All the data transactions between the cores, including the instructions (or "application binary", input data, and output data, may be encapsulated as packets. This simplifies the use of time-division multiplexing when one bus (without separate conductors allocated for different functions) connects different cores 405. Each packet may have a packet ID that specifies the type of packet. The packets may also include a core ID that identifies the destination core 405 for that packet. One bit in each packet may be used to specify the last packet of a series (e.g., the end of the application's binary packets or the end of data input packets). All the inputs and outputs of the cores may be routed by the packet scheduler circuit 440 responsible for creating packets with the correct identifiers and forwarding them to the destination chain 410 (and eventually to the destination core 405). Each of the buses between initial cores and the packet scheduler circuit 440 may be referred to as an "edge bus". In operation, the system of FIG. 4A may, for example, receive a first sequence of symbols (each symbol being, for example, one of 'A', 'C', 'G', and 'T') to be searched using state machines (such as the state machine illustrated in FIG. 1) for the presence of a second sequence of symbols, shorter than the first sequence of symbols. The first sequence of symbols may be divided into four subsequences, and each subsequence may be fed to respective chain. In the first chain, the second, third, and fourth cores may be deactivated, because the initial state, when processing the first subsequence, may be known; therefore the first core may perform the search of the first subsequence, using the known initial state. When the second subsequence is searched, by the second chain (before the search of the first subsequence has been completed), the initial state is not known; as such, in the second chain, each core may perform the search using a different (speculative) initial state. Once the final state after searching the first subsequence is known, the result of the core, of the second chain, that used this state as the initial state may be used (and the results of the remaining cores of the second chain may be discarded). The third and fourth chains may process their respective subsequences in an analogous manner.

Figure 4B:
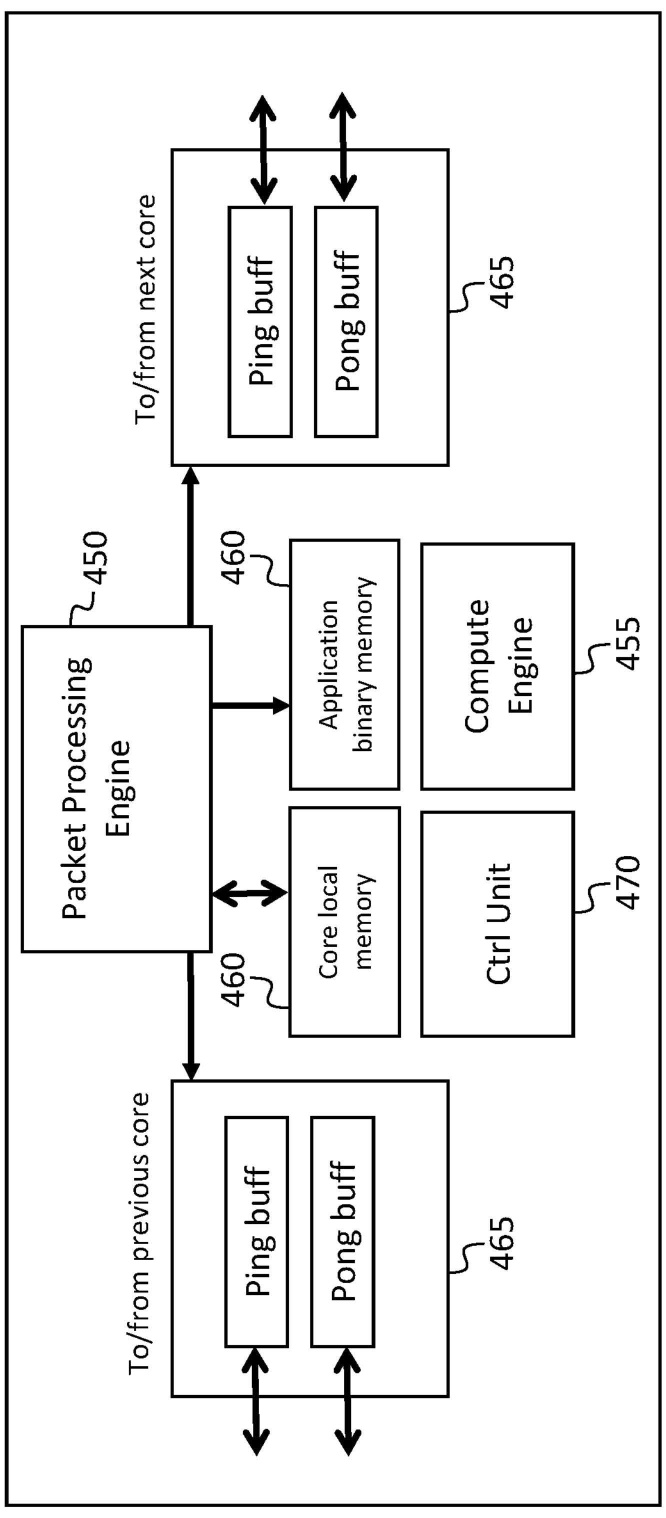
FIG. 4B is a block diagram of a core, according to an embodiment of the present disclosure.

FIG. 4B shows the internal structure of a core 405, in some embodiments. The core 405 has a packet processing engine 450 that processes the incoming packets and (i) decides to consume them locally (if the packet belongs to the core (based on the core ID of the packet)) or (ii) forwards them to the neighboring core 405. The packet processing engine 450 may also create output packets once the core's computation is complete.

The core 405 further includes one compute engine 455, two local on-chip memory units 460 (one for application binary and parameters and one for the application local memory, and input and output data), two sets of ping-pong buffers 465 for storing incoming and outgoing packets, and a core control unit 470. In some embodiments, the application binary and parameters and the application local memory, and input and output data are stored together (e.g., in separate regions of) a single on-chip memory units 460, and only one on-chip memory units 460 is present in the core 405. As used herein, a "core" is a processing circuit including memory and a compute engine 455. The compute engine 455 may be a stored-program computer or it may be a simpler state machine that does not fetch and execute instructions.

The packet processing engine 450 may be responsible for decoding and encoding the incoming and outgoing packets and forwarding them to the proper local buffers (local memory and application memory), or to the next core 405 in the chain. The packet processing engine 450 is invoked by the core's control unit. The packet processing engine 450 may support two main tasks, decode and encode. The decode task may process the incoming packets. It may use the information in the packet to either forward it to the local memories 460 or pass it to the following core 405. The encode task is the opposite of the decode task. It encapsulates the result data with the necessary information the control unit 470 provides and generates packets. By default, all the output packets are forwarded to the initial core of each chain.

The ping-pong buffers 465 may be employed for sending and receiving the packets from the two adjacent cores 405, or, in the case of an initial core, from an adjacent core 405 and from the packet scheduler circuit 440. The packet processing engine 450 may manage the ping-pong buffers 465.

The main application computation (such as dynamic programming, or finite state machine execution) may occur inside the compute engine 455. The compute engine 455 may be constructed in various ways. One option is to construct it as a general-purpose core with a fixed instruction set architecture (ISA). This option may use a compiler that generates (off line, at compile time, e.g., in a separate computing system used to generate executable binary files for the compute engine 455) the application binary for the supported ISA. A second option is to use an application-specific hardware unit such as an application-specific integrated circuit (ASIC) or a field-programmable gate array (FPGA). This dedicated hardware may be designed (in the case of an application-specific integrated circuit) or configured (in the case of a field-programmable gate array) to execute the target application (e.g., dynamic programming or finite state machine execution). The local on-chip memory units 460 may be used by the compute engine 455 to store the application's binary (e.g., the machine-code instructions), the application parameters, the intermediate data, and the input and output data.

Each core 405 may include a control unit 470 (or "control circuit") that controls the order of different operations in the core 405. Each core 405 may begin with reading the program binary and parameter packets and performing the initialization step. If the core is enabled in the first step, it may expect to receive input data chunks. Once the core 405 receives all the data chunks, the compute engine 455 may begin its computation. Finally, once the computation is complete, the results may be sent out by the packet processing engine 450.

Figure 5A:
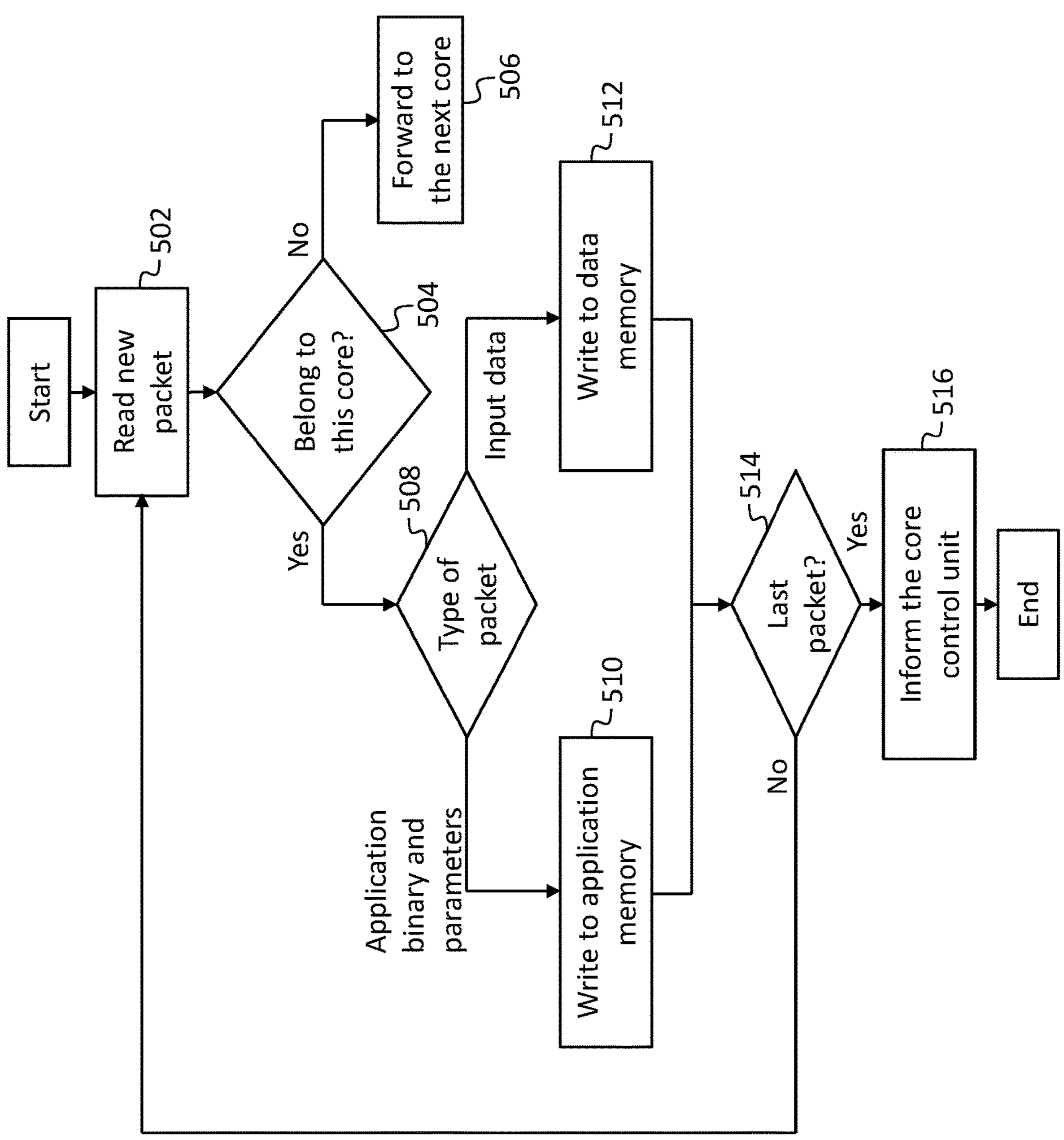
FIG. 5A is a flow chart of the control portion of a packet processing engine, according to an embodiment of the present disclosure.
Figure 5B:
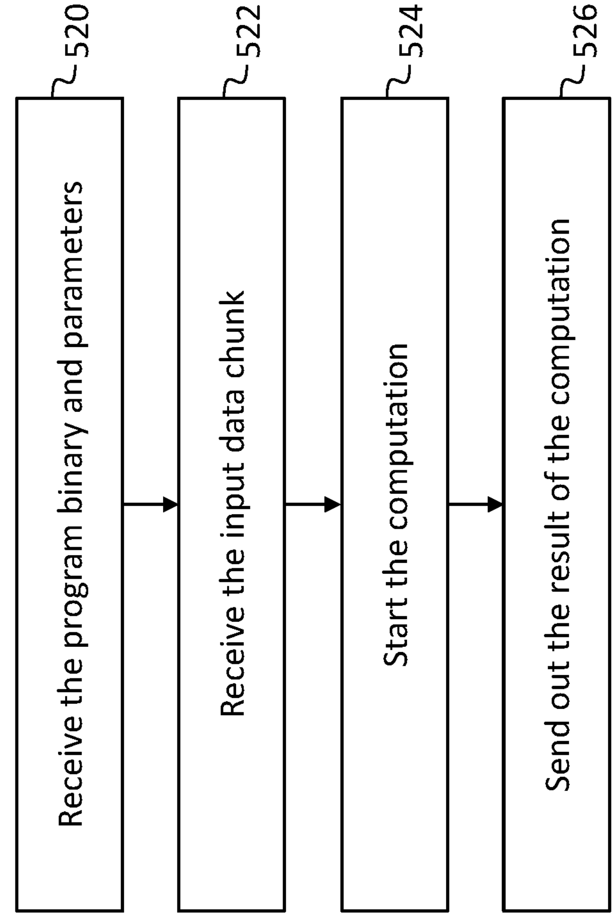
FIG. 5B is a flow chart of the order of operations of a core, according to an embodiment of the present disclosure.

FIG. 5A explains the control portion of the packet processing engine 450 upon receiving a new packet. At 502, a new packet is read, and at 504 the core 405 determines whether the packet is addressed to the core 405 or to another core 405. If the packet is addressed to another core 405, the core 405 forwards, at 506, the packet to the next core 405. If the packet is not addressed to another core, then, at 508, the core 405 determines (based on the packet ID of the packet) what type of packet the packet is. If the packet is an application binary and parameters type packet, then, at 510, the core 405 writes the payload of the packet to application memory. If the packet is an input data type packet, then, at 512, the core 405 writes the payload of the packet to data memory. At 514, the core 405 determines (based on the bit in each packet that may be used to specify the last packet of a series) whether the packet is the last packet; if the packet is the last packet, the core 405 informs, at 516, the core control unit 470; otherwise, control returns to step 502. FIG. 5B shows the order of the main operations of a core 405. At 520, the core 405 receives the program binary and parameters; at 522, the core 405 receives the input data chunk; at 524, the core 405 starts the computation; and at 526, the core 405 sends out the result of the computation.

The initial core 405 of each chain 410 may be responsible for communicating the final result of that chain 410. To achieve this, the initial core may verify whether any of the speculative computations done by the rest of the cores in the chain are correct (or parallel to the correct answer, for a problem in which the output is a vector). This decision is based on the final state of the computation received from the previous chain. In cases where none of the speculative executions yield a correct result, the first core may redo the computation using the correct (non-speculative) initial state.

Because the initial core 405 of each chain may perform more tasks than the other cores 405 of the chain 410, the initial core of each chain 410 may have access to greater computational and memory resources than the other cores 405 in the chain 410. For example, since the initial core 405 of each chain receives packets from all other cores 405 of the chain, the packet scheduler may process the packets with higher throughput. Similarly, the initial core 405 of each chain may store all the results from other cores 405 of the chain for the fixup phase. Therefore, the initial core 405 may have a larger on-chip memory for this purpose. The initial core 405 may also have a more capable compute engine, which may be implemented as part of an application-specific integrated circuit.

The packet scheduler circuit 440 may perform data chunking and the scheduling of the data chunks to the chains 410 (e.g., to the cores 405). The packet scheduler may support two modes. In a first mode, the data chunks are fixed size with no data overlap. The data chunk size is fixed during the entire execution, at a size that may be set by the user in an initialization step. In a second mode, the packet scheduler circuit 440 uses fixed-size data chunks but leaves an overlapped area (or an "overlap portion") between them. The size of the overlapped area may be controlled and set by the user in the initialization step. This mode may be helpful for some finite state machine applications as it improves convergence in speculation mode, as discussed above.

In some embodiments, a variable number of cores 405 may be chosen to do the speculative computation. For example, all of the cores 405, except the initial core of each chain, may be enabled or disabled by the user to be involved or not involved in the computation. This configuration may be performed in the initial phase, and all the cores that are disabled may remain idle throughout the rest of the computation. In some embodiments, cores 405 may be enabled or disabled dynamically, at run time, for example by control packets sent by the packet scheduler circuit 440 for this purpose. In some embodiments, all of the cores 405 of a pipeline except the initial core are disabled when no speculative computations are to be performed (e.g., if the initial state of a computation is known). In some embodiments, the number of cores used (e.g., not disabled) is based on the number of speculative operations (e.g., the number of speculative computations) to be performed.

The number of cores 405 that the user enables may affect the speculation level. The highest level of speculation may occur when all the cores 405 are enabled. In cases in which only the first core of each chain 410 is enabled, the computation may be performed sequentially. For example, the cores 405 may begin the computation only when the starting state is known (received from the previous chain). In some embodiments, the cores 405 that are not active (that are still waiting to receive the starting state) may load the input data into their local memory to prepare for execution. Such a mode of operation may help to saturate the input bandwidth and to reduce the overall execution time.

Flexible software application programming interfaces (APIs) may be employed for efficient speculative execution of dynamic programming and finite state machine applications. The user may provide the application code (e.g., for dynamic programming, or for finite state machine execution) that is to be run by the compute engines 455 in the cores. If the compute engine 455 is general-purpose hardware (e.g., a central processing unit (CPU)), then the program may be compiled by an appropriate compiler, and the binary application may be forwarded to each core for execution by the compute engine 455. If the compute engine is a field programmable gate array or programmable logic, the user may provide the binary file (e.g., a suitable bit file) to program the logic.

In addition to the application binary, the user may define additional parameters and pass them to the compute engine 455. These parameters may include the initial speculative state for finite state machine execution or the speculative values of the previous subproblems in dynamic programming execution. The user may specify how the result of the speculative execution should be verified. The verification can be performed by all the compute engines 455, for example, or only by the initial core 405 of each chain 410. The user may also configure some of the features of the system prior to program execution. This may include disabling speculation, defining the number of cores 405 involved in the speculative execution, setting the data chunking mode, and defining the size of the overlapped data between the data chunks.

Figure 6:
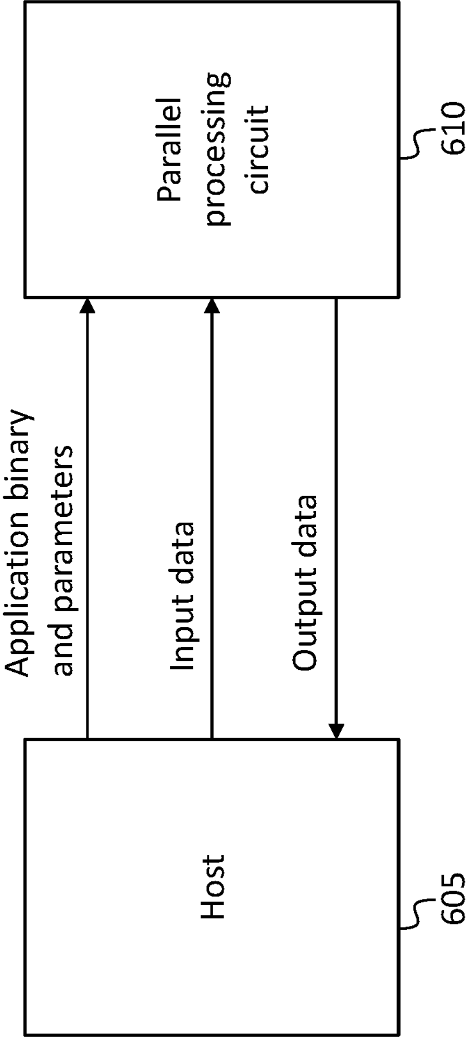
FIG. 6 is a system-level block diagram, according to an embodiment of the present disclosure.

FIG. 6 is a block diagram of a system including a host 605 and a parallel processing circuit 610. The parallel processing circuit 610 may be, or include, for example, a circuit such as that shown in FIGS. 4A and 4B. In operation, the host 605 may send instructions (e.g., in binary form) and parameters to the parallel processing circuit 610, and it may then send input data, to be processed by the parallel processing circuit 610, to the parallel processing circuit 610. The parallel processing circuit 610 may process the input data, generating output data, and it may send the output data to the host 605.

Figure 7:
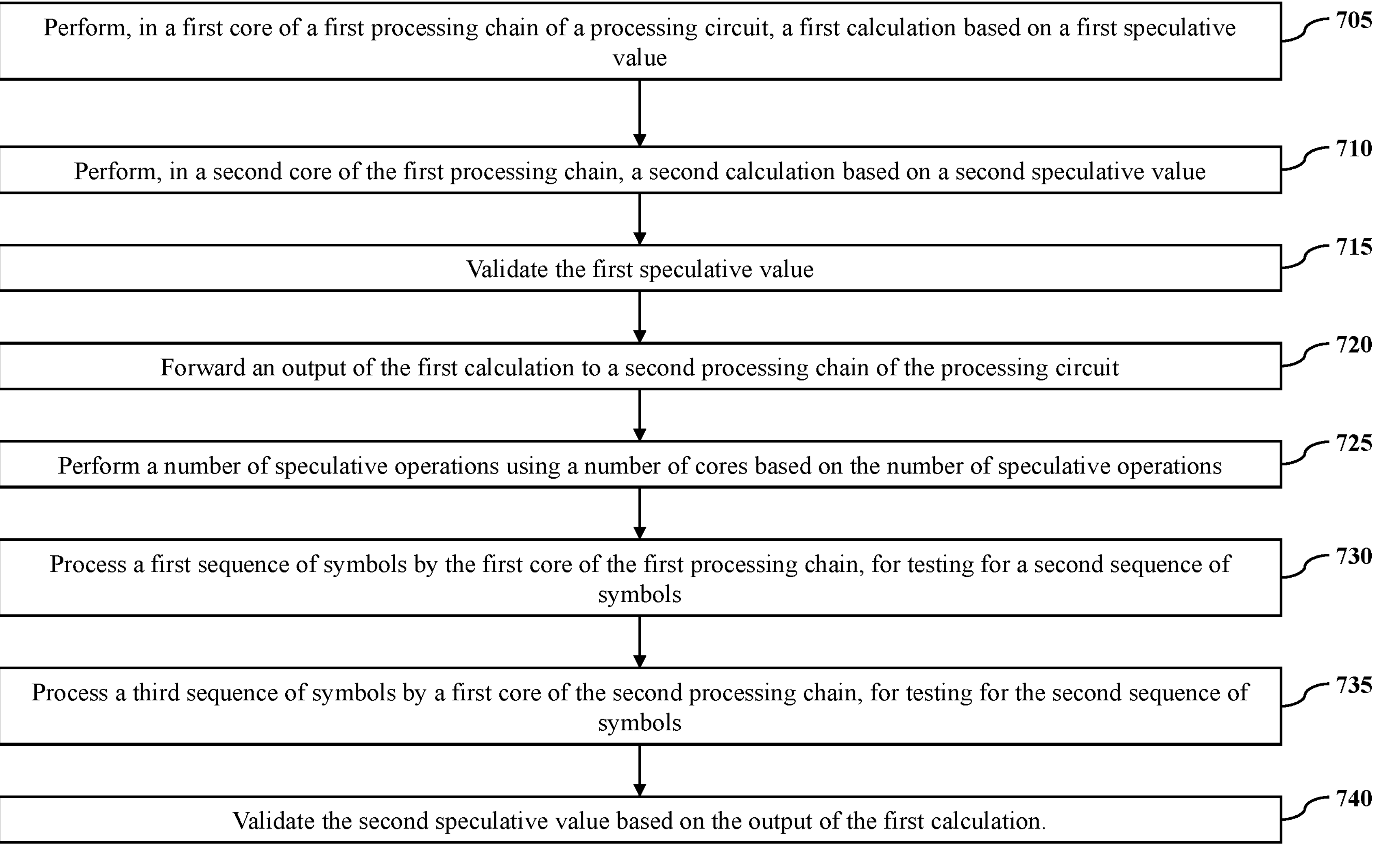
FIG. 7 is a flow chart of a method, according to an embodiment of the present disclosure.

FIG. 7 is a flowchart of a method, in some embodiments. The method includes performing, at 705, in a first core of a first processing chain of a processing circuit, a first calculation based on a first speculative value; performing, at 710, in a second core of the first processing chain, a second calculation based on a second speculative value; validating, at 715, the first speculative value; forwarding, at 720, an output of the first calculation to a second processing chain of the processing circuit; performing, at 725, a number of speculative operations using a number of cores based on the number of speculative operations; processing, at 730, a first sequence of symbols by the first core of the first processing chain, for testing for a second sequence of symbols; processing, at 735, a third sequence of symbols by a first core of the second processing chain, for testing for the second sequence of symbols; and validating, at 740, the second speculative value based on the output of the first calculation.

Some embodiments may include features of the following numbered statements.

1. A system, comprising:
 a first processing chain; and
 a second processing chain,
 the first processing chain comprising:
  a first core;
  a second core; and
  a first inter-core bus connecting the second core of the first processing chain to the first core of the first processing chain
 the system being configured to forward an output of a calculation of the first processing chain to the second processing chain.

2. The system of statement 1, wherein the first core of the first processing chain comprises:
 a memory; and
 a packet processing circuit,
 the packet processing circuit being configured:
  to receive a packet comprising instructions; and
  to store the instructions in the memory.

3. The system of statement 1 or statement 2, wherein the first processing chain is configured:
 to perform, in the first core of the first processing chain, a first calculation based on a first speculative value;
 to perform, in the second core of the first processing chain, a second calculation based on a second speculative value; and
 to validate the first speculative value,
 wherein the forwarding of the output of the first calculation to the second processing chain is based on the validating.

4. The system of any one of the preceding statements, wherein the system is configured to perform a number of speculative operations using a number of cores based on the number of speculative operations.

5. The system of any one of the preceding statements, further comprising a first inter-chain bus,
 wherein an initial core of the first processing chain is connected, through the first inter-chain bus, to an initial core of the second processing chain.

6. The system of statement 5, further comprising:
 a third processing chain; and
 a second inter-chain bus,
 wherein an initial core of the first processing chain is connected, through the second inter-chain bus, to an initial core of the third processing chain.

7. The system of any one of the preceding statements, further comprising a packet scheduler connected to the first processing chain and to the second processing chain, the packet scheduler being configured to send, to each of the first processing chain and the second processing chain, packets comprising instructions, parameters, and input data.

8. The system of any one of the preceding statements, further comprising a packet scheduler connected to the first processing chain, the packet scheduler being configured:
 to send a first sequence of symbols to the first core of the first processing chain, for testing for a second sequence of symbols; and
 to send a third sequence of symbols to a first core of the second processing chain, for testing for the second sequence of symbols,
 wherein the first sequence of symbols overlaps with the third sequence of symbols.

9. The system of statement 8, wherein the first sequence of symbols overlaps with the third sequence of symbols in an overlapped area having a size greater than the second sequence of symbols.

10. A method, comprising:
 performing, in a first core of a first processing chain of a processing circuit, a first calculation based on a first speculative value;
 performing, in a second core of the first processing chain, a second calculation based on a second speculative value;
 validating the first speculative value; and
 forwarding an output of the first calculation to a second processing chain of the processing circuit.

11. The method of statement 10, wherein the first core of the first processing chain comprises:
 a memory; and
 a packet processing circuit,
 the packet processing circuit being configured:
  to receive a packet comprising instructions; and
  to store the instructions in the memory.

12. The method of statement 10 or statement 11, comprising performing a number of speculative operations using a number of cores based on the number of speculative operations.

13. The method of any one of statements 10 to 12, wherein the processing circuit further comprises a first inter-chain bus, wherein an initial core of the first processing chain is connected, through the first inter-chain bus, to an initial core of the second processing chain.

14 The method of statement 13, wherein the processing circuit further comprises:

a third processing chain; and a second inter-chain bus, wherein an initial core of the first processing chain is connected, through the second inter-chain bus, to an initial core of the third processing chain.

15. The method of method of any one of statements 10 to 14, wherein the processing circuit further comprises a packet scheduler connected to the first processing chain and to the second processing chain, the packet scheduler being configured to send, to each of the first processing chain and the second processing chain, packets comprising instructions, parameters, and input data.

16. The method of method of any one of statements 10 to 15, further comprising:

processing a first sequence of symbols by the first core of the first processing chain, for testing for a second sequence of symbols; and processing a third sequence of symbols by a first core of the second processing chain, for testing for the second sequence of symbols, wherein the first sequence of symbols overlaps with the third sequence of symbols.

17. The method of any one of statements 10 to 16, further comprising validating the second speculative value based on the output of the first calculation.

18. A system, comprising:

a first processing chain, comprising a first core and a second core;

a second processing chain; and a packet scheduler, the first core being connected by an edge bus to the packet scheduler, the packet scheduler being configured:

to connect to a host;

to send packets to the first core of the first processing chain; and to receive packets from the first core of the first processing chain.

19. The system of statement 18, wherein the first core of the first processing chain is connected to the second core of the first processing chain by a first inter-core bus.

20. The system of statement 18 or statement 19, further comprising a first inter-chain bus, wherein an initial core of the first processing chain is connected, through the first inter-chain bus, to an initial core of the second processing chain.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

It will be understood that when an element is referred to as being "directly connected" or "directly coupled" to another element, there are no intervening elements present. As used herein, "generally connected" means connected by an electrical path that may contain arbitrary intervening elements, including intervening elements the presence of which qualitatively changes the behavior of the circuit. As used herein, "connected" means (i) "directly connected" or (ii) connected with intervening elements, the intervening elements being ones (e.g., low-value resistors or inductors, or short sections of transmission line) that do not qualitatively affect the behavior of the circuit.

Although exemplary embodiments of systems and methods for parallel data processing have been specifically described and illustrated herein, many modifications and variations will be apparent to those skilled in the art. Accordingly, it is to be understood that systems and methods for parallel data processing constructed according to principles of this disclosure may be embodied other than as specifically described herein. The invention is also defined in the following claims, and equivalents thereof.

What is claimed is:

1. A system, comprising:

a first processing chain; and a second processing chain, the first processing chain comprising:

a first core;

a second core; and a first inter-core bus connecting the second core of the first processing chain to the first core of the first processing chain; and the system being configured to forward an output of a calculation of the first processing chain to the second processing chain, wherein the first core verifies a speculative operation done by the second core.

2. The system of claim 1, wherein the first core of the first processing chain comprises:

a memory; and a packet processing circuit, the packet processing circuit being configured:

to receive a packet comprising instructions; and to store the instructions in the memory.

3. The system of claim 1, wherein the first processing chain is configured:

to perform, in the first core of the first processing chain, a first calculation based on a first speculative value;

to perform, in the second core of the first processing chain, a second calculation based on a second speculative value; and to validate the first speculative value, wherein the forwarding of the output of the first calculation to the second processing chain is based on the validating.

4. The system of claim 1, wherein the system is configured to perform a number of speculative operations using a number of cores based on the number of speculative operations.

5. The system of claim 1, further comprising a first inter-chain bus, wherein an initial core of the first processing chain is connected, through the first inter-chain bus, to an initial core of the second processing chain.

6. The system of claim 5, further comprising:

a third processing chain; and a second inter-chain bus, wherein an initial core of the first processing chain is connected, through the second inter-chain bus, to an initial core of the third processing chain.

7. The system of claim 1, further comprising a packet scheduler connected to the first processing chain and to the second processing chain, the packet scheduler being configured to send, to each of the first processing chain and the second processing chain, packets comprising instructions, parameters, and input data.

8. The system of claim 1, further comprising a packet scheduler connected to the first processing chain, the packet scheduler being configured:

to send a first sequence of symbols to the first core of the first processing chain, for testing for a second sequence of symbols; and to send a third sequence of symbols to a first core of the second processing chain, for testing for the second sequence of symbols, wherein the first sequence of symbols overlaps with the third sequence of symbols.

9. The system of claim 8, wherein the first sequence of symbols overlaps with the third sequence of symbols in an overlapped area having a size greater than the second sequence of symbols.

* * * * *